(12) United States Patent
Scott et al.

(10) Patent No.: US 10,840,706 B2
(45) Date of Patent: Nov. 17, 2020

(54) VOLTAGE DROOP COMPENSATION FOR A UTILITY POWER SYSTEM

(71) Applicant: INVENTUS HOLDINGS, LLC, Juno Beach, FL (US)

(72) Inventors: Michael A. Scott, Palm Beach, FL (US); Carmine A. Priore, III, Wellington, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 334 days.

(21) Appl. No.: 15/908,144

(22) Filed: Feb. 28, 2018

(65) Prior Publication Data

US 2019/0267806 A1 Aug. 29, 2019

(51) Int. Cl.
*H02J 3/18* (2006.01)
*H02J 3/38* (2006.01)
*H02J 13/00* (2006.01)
*G05B 19/042* (2006.01)

(52) U.S. Cl.
CPC .............. *H02J 3/18* (2013.01); *G05B 19/042* (2013.01); *H02J 3/383* (2013.01); *H02J 3/386* (2013.01); *H02J 13/0006* (2013.01); *G05B 2219/2639* (2013.01)

(58) Field of Classification Search
None
See application file for complete search history.

(56) References Cited

U.S. PATENT DOCUMENTS

| 4,701,690 A | 10/1987 | Fernandez et al. | |
| 7,027,944 B2 | 4/2006 | Tabaian et al. | |
| 2012/0243274 A1* | 9/2012 | Feng | H02M 7/23 363/69 |
| 2016/0336928 A1* | 11/2016 | Kuznetsov | H03K 3/53 |
| 2017/0009745 A1* | 1/2017 | Brogan | F03D 9/257 |

OTHER PUBLICATIONS

Basler Electric, Publication 9147300990, "Instructions for Paralleling Module APM2000", Copyright 2003.

* cited by examiner

*Primary Examiner* — Jared Fureman
*Assistant Examiner* — Aqeel H Bukhari
(74) *Attorney, Agent, or Firm* — Christopher P. Harris; Tarolli, Sundheim, Covell & Tummino, LLP (57) ABSTRACT

One example includes a utility power system. The system includes a power generator system, the power generator system comprising a generator step-up (GSU) transformer and a power generator. The power generator can be configured to provide generator power to a power transmission system via the GSU transformer in a feedback manner based on a predetermined setpoint. The system further includes a voltage droop compensation controller configured to monitor the generator power at a high-side of the GSU transformer and to adjust the predetermined setpoint based on the monitored generator power to substantially mitigate circulating currents.

18 Claims, 4 Drawing Sheets

FIG. 4

VOLTAGE DROOP COMPENSATION FOR A UTILITY POWER SYSTEM

TECHNICAL FIELD

This disclosure relates generally to power generator systems, and more specifically to voltage droop compensation for a utility power system.

BACKGROUND

Power generating stations, such as from wind turbine sites (e.g., wind farms), solar power generator sites (e.g., solar farms), or any other power generator systems, can provide power to a power transmission system (e.g., power grid). For a given type of power supply system, the amount of power that is generated from the power generating station can be regulated to ensure that the power that is provided to a given point-of-interconnect (POI), such as coupled to the power grid, is sufficient to deliver the desired amount of real power (megawatts) to a point within a designated voltage range. The voltage can be regulated by adjusting the amount of reactive power (megavars) that the generating station produces or consumes. An Automatic Voltage Regulator (AVR) is used to regulate the reactive power of a generating station. However, multiple power generator stations, such as proximally located relative to each other, can be subject to interaction with other, in which unwanted circulating currents can provide an uneven proportional share of the reactive power that is provided to the power transmission system from the respective power generator stations.

SUMMARY

One example includes a utility power system. The system includes a power generator system, the power generator system comprising a generator step-up (GSU) transformer and a power generator. The power generator can be configured to provide generator power to a power transmission system via the GSU transformer in a feedback manner based on a predetermined setpoint. The system further includes a voltage droop compensation controller configured to monitor the generator power at a high-side of the GSU transformer and to adjust the predetermined setpoint based on the monitored generator power to substantially mitigate circulating currents.

Another example includes a method for mitigating circulating currents in a utility power system. The method includes providing generator power from a power generator to a power transmission system via a generator step-up (GSU) transformer and measuring the generator power at a high-side of the GSU transformer. The method also includes regulating generator reactive power from the power generator based on the transmission system voltage associated with the measured generator power relative to a predetermined voltage setpoint and monitoring a reactive power associated with the generator power. The method further includes adjusting the predetermined voltage setpoint based on the monitored reactive power.

Another example includes a utility power system. The system includes a plurality of power generator systems. Each of the power generator systems includes a generator step-up (GSU) transformer and a power generator. The power generator can be configured to provide generator power to a power transmission system via the GSU transformer in a feedback manner based on a predetermined setpoint. The system also includes a voltage droop compensation controller configured to monitor a reactive power associated with the generator power at a high-side of the GSU transformer of each of the plurality of power generator systems and to adjust the predetermined setpoint associated with the respective one of the plurality of power generator systems based on the monitored reactive power associated with the respective one of the plurality of power generator systems to substantially mitigate circulating currents.

DETAILED DESCRIPTION

This disclosure relates generally to power generator systems, and more specifically to voltage droop compensation for a utility power system. In a given power generator, such as a wind farm, solar farm, battery system, or any of a variety of other types of power generator systems, the power generator can provide generator power to a power transmission system, which can be provided to a point of interconnect (POI) to a power grid for use by consumers. As an example, each of the power generator systems can include a power meter to monitor the generator power at the high-side of a generator step-up (GSU) transformer through which the power generator provides the generator power to the power transmission system. The power meter can provide a voltage associated with the generator power to an automatic voltage regulator (AVR) that can regulate the reactive power output of the power generator based on the monitored voltage relative to a predetermined voltage setpoint.

The voltage droop compensation controller can be implemented as a controller external to a generating station AVR to implement voltage droop compensation for the utility power system. As an example, to implement voltage droop compensation, the voltage droop compensation controller can implement an external control loop that can monitor the reactive power of a given one of the power generator systems as measured at the high-side of the GSU transformer. The voltage droop compensation controller can thus compare the reactive power with a threshold, such as a predetermined maximum reactive power capability of the generator or reactive power requirement of an associated interconnect agreement. The external control loop can also be programmed with a threshold, such as a predetermined droop percentage. The predetermined droop percentage can correspond, for example, to a threshold percentage of allowed deviation of the transmission system voltage relative to the predetermined voltage setpoint. The voltage droop compensation controller can regulate the reactive power at the high side of the GSU such that the amount of reactive power is proportional to percent difference between the measured voltage and the voltage setpoint. As a result, the power generating system provides the predetermined maximum reactive power when the percent difference in the measured voltage and the voltage setpoint is equal to the predetermined droop percentage. Therefore, the voltage droop compensation controller can adjust the predetermined voltage setpoint based on the monitored reactive power. As a result, the voltage droop compensation controller can substantially mitigate circulating currents in the utility power system.

Figure 1:
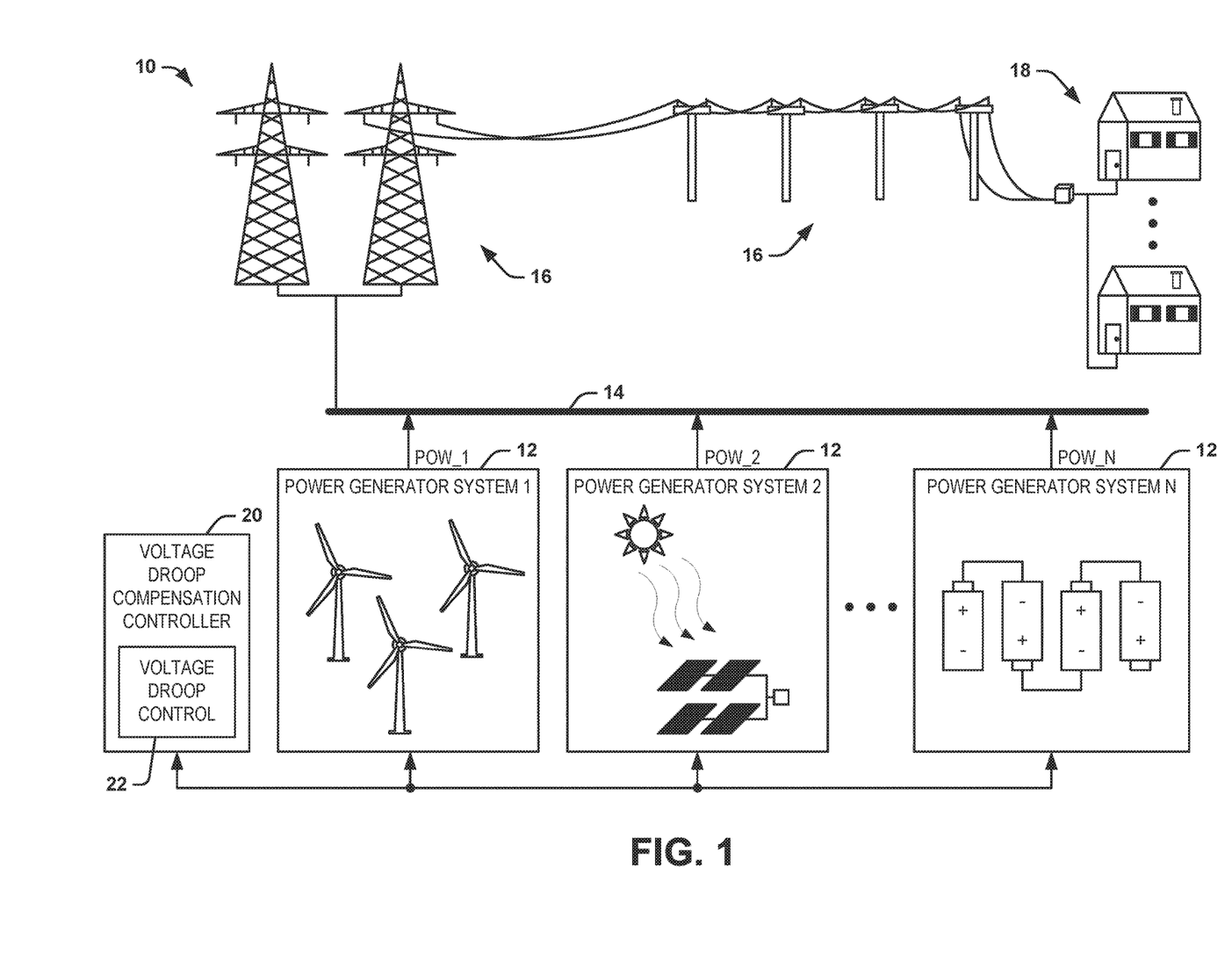
FIG. 1 illustrates an example of a utility power system.

Voltage droop compensation can be implemented through a control loop external to the AVR in any of a variety of utility power systems, such as demonstrated in the example of FIG. 1. FIG. 1 illustrates an example of a utility power system 10. The utility power system 10 includes a plurality N of power generator systems 12 that are each configured to provide generator power, demonstrated in the example of FIG. 1 as POW_1 through POW_N, to a power transmission system 14, which can correspond to a power bus or point-of-interconnect (POI) that provides power to via power lines and power-carrying equipment, demonstrated generally at 16, to consumers, demonstrated generally at 18. In the example of FIG. 1, the power generator systems 12 are demonstrated as each being arranged as any of a variety of power generator systems, such as wind power, solar power, or battery power. However, the power generator systems 12 are not limited to the energy sources demonstrated, and can include hydroelectric power or geothermal power, and can further include other types of non-renewable power generators, such as coal power, nuclear power, or other types of power. In addition, the utility power system 10 includes a voltage droop compensation controller 20 that is configured to implement a voltage droop control algorithm 22. The voltage droop compensation controller 20 can monitor the reactive power of each of the power generator systems 12, such that the voltage droop control algorithm 22 can adjust the voltage setpoint of each of the power generator systems 12 to mitigate voltage droop, as described herein.

Figure 2:
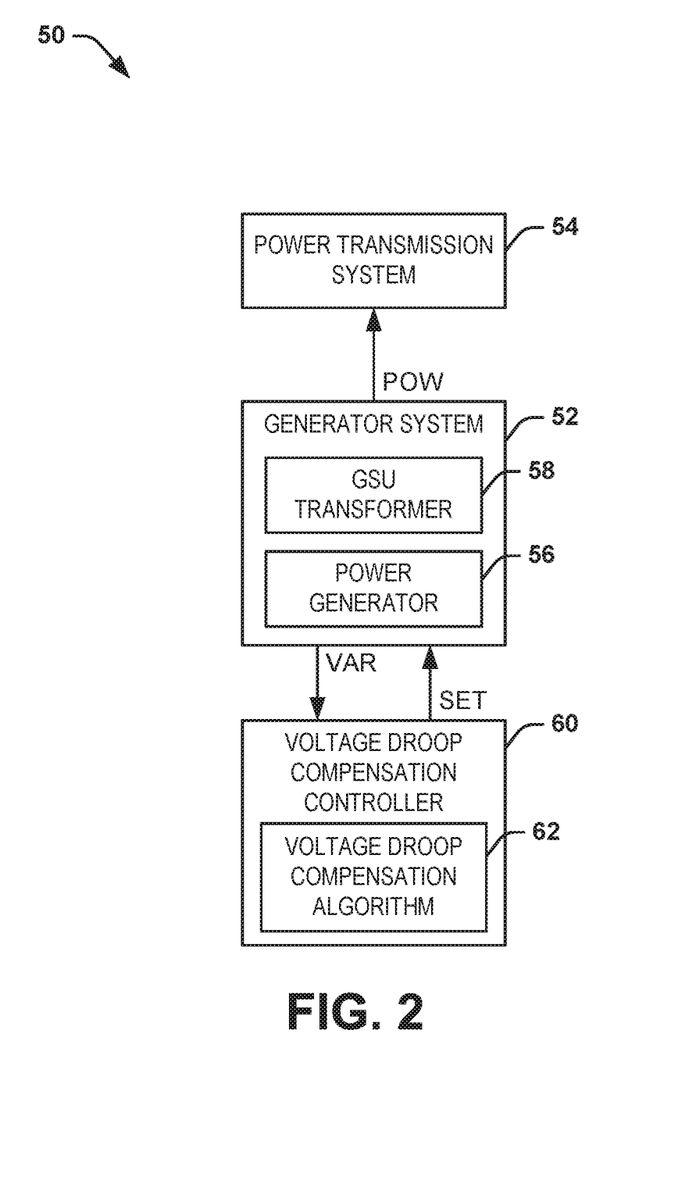
FIG. 2 illustrates another example of a utility power system.

FIG. 2 illustrates another example of a utility power system 50. The utility power system 50 can correspond to a portion of the utility power system 10 in the example of FIG. 1. Therefore, reference is to be made to the example of FIG. 1 in the following description of the example of FIG. 2.

The utility power system 50 includes a power generator system 52 that is configured to provide generator power POW to a power transmission system 54. The power generator system 52 includes a power generator 56. As described herein, the term "power generator" can refer to a single power providing apparatus (e.g., a single wind-turbine, solar cell, battery cell) or a collection of power providing apparatuses of one type or more than one type. As an example, the power generator system 52 can be configured as any of the power generator systems 12 in the example of FIG. 1, such that the power generator 56 can correspond to a wind power generator system, a solar power generator system, a battery power generator system, or any of a variety of other types of power generators. The power generator system 52 also includes a GSU transformer 58 that conducts the generator power POW to the power transmission system 54, such as in a closed-loop manner based on a transmission system voltage associated with the generator power POW relative to a predetermined voltage setpoint. As an example, the power generator 56 can be regulated in the closed-loop manner via a power meter and an AVR, as described in greater detail herein.

In addition, the utility power system 50 includes a voltage droop compensation controller 60 that is configured to implement a voltage droop compensation control algorithm 62. In the example of FIG. 2, the voltage droop compensation controller 60 can monitor the reactive power, demonstrated in the example of FIG. 2 as "VAR", of the power generator system 52 based on the generator reactive power POW provided to the power transmission system 54 at the high-side of the GSU transformer 58. The voltage droop compensation algorithm 62 can thus compare the reactive power VAR with a threshold, such as a predetermined droop percentage. The predetermined droop percentage can correspond, for example, to a threshold with respect to the transmission system voltage relative to the predetermined voltage setpoint, demonstrated in the example of FIG. 2 as "SET" provided from the voltage droop compensation controller 60 to the power generator system 52.

As an example, the predetermined droop percentage can correspond to a threshold percentage of deviation of the transmission system voltage relative to the predetermined voltage setpoint SET at a maximum reactive power of the power generator 56. Therefore, the voltage droop control algorithm 62 can adjust the predetermined voltage setpoint SET based on the monitored reactive power VAR. For example, the voltage droop control algorithm 62 can adjust the predetermined setpoint relative to a proportion of the predetermined droop percentage by an approximately equal proportion of the reactive power VAR relative to the maximum reactive power associated with the power generator 56. Therefore, the voltage droop compensation controller 60 can substantially mitigate the occurrence of circulating currents in the utility power system 50.

As described in the example of FIG. 2, voltage droop control can be performed with respect to a single power generator system 52, such that the voltage droop control algorithm 62 is configured to implement voltage droop control based on the reactive power VAR feedback from a single power generator system 52. However, the voltage droop compensation controller 60 can also be configured to monitor the reactive power VAR feedback from multiple power generator systems 52, such that the voltage droop control algorithm 62 can adjust the setpoint of multiple power generator systems 52 to mitigate circulating currents for multiple power generator systems, such as demonstrated in the example of FIG. 1.

Figure 3:
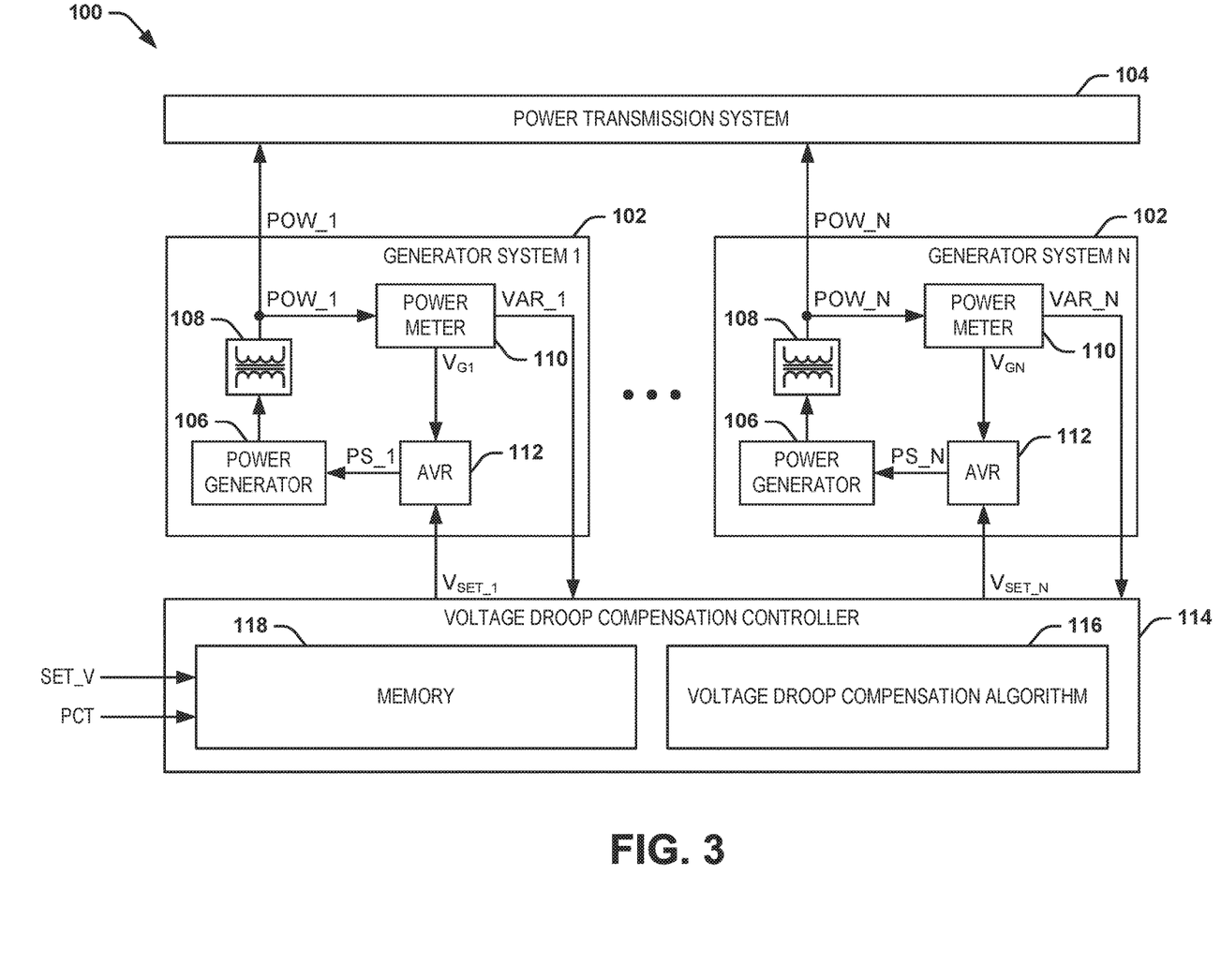
FIG. 3 illustrates yet another example of a utility power system.

FIG. 3 illustrates yet another example of a utility power system 100. The utility power system 100 can correspond to a portion of the utility power system 10 in the example of FIG. 1. Therefore, reference is to be made to the example of FIG. 1 in the following description of the example of FIG. 3.

The utility power system 100 includes a plurality N of power generator systems 102. Each of the power generator systems is configured to provide generator power POW to a power transmission system 104, such that the generator power is demonstrated respectively as POW_1 through POW_N. Each of the power generator systems 102 includes a respective power generator 106. Similar to as described previously, the power generator system 102 can be configured as any of the power generator systems 12 in the example of FIG. 1, such that the power generator 106 associated with each of the respective power generator systems can correspond to one of a wind power generator system, a solar power generator system, a battery power generator system, or any of a variety of other types of power generators.

Each of the power generator systems 102 also includes a GSU transformer 108, a power meter 110, and an AVR 112. The GSU transformer 108 steps-up power provided by the power generator 106 to provide the respective generator power POW to the power transmission system 104. The power meter 110 is configured to monitor the generator power POW provided at the high-side of the GSU transformer 108. For example, the power meter 110 can monitor both a respective transmission system voltage $V_G$ associated with the generator power POW and a respective reactive power VAR associated with the generator power POW. In the example of FIG. 3, the respective transmission system voltage $V_G$ is provided to the AVR 112, such that the AVR 112 can regulate the reactive power output of the respective power generator 106 in a closed-loop manner. For example, the AVR 112 can compare the respective transmission system voltage $V_G$ with a respective voltage setpoint $V_{SET}$, and can provide a respective reactive power command PS to the power generator 106 to adjust the reactive power provided by the power generator 106. As a result, the AVR 112 can provide that the respective generator reactive power POW is provided in a closed-loop manner based on the respective transmission system voltage relative to the predetermined voltage setpoint $V_{SET}$.

In addition, the utility power system 100 includes a voltage droop compensation controller 114 that is configured to implement a voltage droop control algorithm 116. As an example, the voltage droop compensation controller 114 can be configured to implement as an external voltage droop compensation loop. In the example of FIG. 3, each of the power generator systems 102 is configured to provide the respective reactive power VAR associated with the generator power POW at the high-side of the GSU transformer 108 to the voltage droop compensation controller 114. As an example, the power meter 110 is configured to provide the respective reactive power measurement VAR to the voltage droop compensation controller 114. The voltage droop control algorithm 116 can thus compare the respective reactive power VAR with a threshold, such as a predetermined droop percentage.

In the example of FIG. 3, the voltage droop compensation controller 114 also includes a memory 118, which can be configured as a single or distributed memory. As an example, the memory 118 can be configured to store the voltage droop control algorithm 116, such that a processor associated with the voltage droop compensation controller 114 can execute the voltage droop control algorithm 116 from the memory 118. Additionally, the memory 118 can be configured to store the predetermined droop percentage PCT, such as can be provided via the respective power provider. The predetermined droop percentage PCT can correspond, for example, to a threshold with respect to the transmission system voltage relative to the respective predetermined voltage setpoint $V_{SET}$ provided from the voltage droop compensation controller 114 to each of the power generator systems 102. Additionally, the memory 118 can be configured to store a predetermined nominal voltage setpoint, demonstrated in the example of FIG. 3 as a signal SET_V. As an example, the predetermined nominal voltage setpoint can correspond to a baseline voltage setpoint associated with each of the respective predetermined voltage setpoints $V_{SET}$.

As described previously, the predetermined droop percentage PCT can correspond to a threshold percentage of deviation of the transmission system voltage $V_G$ relative to the predetermined voltage setpoint $V_{SET}$ at a maximum reactive power of the respective power generator 106. Therefore, the voltage droop control algorithm 116 can adjust the predetermined voltage setpoint $V_{SET}$ based on the monitored reactive power VAR. For example, for a given one of the power generator systems 102, the voltage droop control algorithm 116 can compare the respective monitored reactive power VAR relative to a maximum reactive power associated with the respective power generator 106 of the power generator system 102. Based on a relative value of the monitored reactive power VAR and the maximum reactive power, the predetermined droop percentage PCT can thus dictate an amplitude percentage of change of the respective predetermined voltage setpoint $V_{SET}$. As an example, the voltage droop control algorithm 116 can calculate an adjustment voltage amplitude (e.g., a positive or negative voltage amplitude) that is added to the predetermined nominal voltage setpoint SET_V. Therefore, the sum of the predetermined nominal voltage setpoint SET_V and the adjustment voltage amplitude can correspond to the new respective predetermined voltage setpoint $V_{SET}$ that is provided to the AVR 112 of the respective one of the power generator systems 102.

As an example, the voltage droop control algorithm 116 can adjust the respective predetermined voltage setpoint $V_{SET}$ relative to a proportion of the predetermined droop percentage PCT by an approximately equal proportion of the monitored reactive power VAR relative to a maximum reactive power associated with the respective power generator 106. For example, for a given one of the power generator systems 102, the respective power generator 106 can provide +/−30 MVar of reactive power. If the predetermined droop percentage PCT is set to 3%, and the voltage droop control algorithm 116 determines that the monitored reactive power VAR is −10 MVar (e.g., the power generator 106 is providing 10 MVar to the power transmission system 104 via the GSU transformer 108), then the voltage droop control algorithm 116 can adjust the respective predetermined voltage setpoint $V_{SET}$ by 1%. For example, the voltage droop control algorithm 116 can generate a negative adjustment voltage amplitude that is sufficient to reduce the respective predetermined voltage setpoint $V_{SET}$ by 1% when added to the predetermined nominal voltage setpoint SET_V. Therefore, in the example, the voltage droop control algorithm 116 adjusts the respective predetermined voltage setpoint $V_{SET}$ by 1%, which is the same proportion (e.g., ⅓) of the predetermined droop percentage PCT as the proportion (e.g., ⅓) of the monitored reactive power VAR (e.g., 10 MVar) relative to the maximum reactive power (e.g., 30 MVar). Similarly, if the predetermined droop percentage PCT is set to 3%, and the voltage droop control algorithm 116 determines that the monitored reactive power VAR is −20 MVar, then the voltage droop control algorithm 116 can adjust the respective predetermined voltage setpoint $V_{SET}$ by 2%. Similarly, if the predetermined droop percentage PCT is set to 3%, and the voltage droop control algorithm 116 determines that the monitored reactive power VAR is +15 MVar (e.g., the power generator 106 is providing 15 MVar to the power transmission system 104 via the GSU transformer 108), then the voltage droop control algorithm 116 can adjust the respective predetermined voltage setpoint $V_{SET}$ by −1.5%, and thus reduce the respective predetermined voltage setpoint $V_{SET}$ by 1.5%.

As a result, the voltage droop control algorithm 116 can be implemented to substantially mitigate the occurrence of circulating currents in the power utility system 100. For example, because the voltage droop control algorithm 116 can adjust the respective voltage setpoint $V_{SET}$ for each of the power generator systems 102 in a feedback manner based on the reactive power VAR. As a result, the voltage droop control algorithm 116 can ensure that a power generator 106 of a given one of the power generator systems 102 does not disproportionally provide generator power POW to the power transmission system 104 while another power generator 106 of another one of the power generator systems 102 provides very little (or absorbs) generator power POW to the power transmission system 104. Accordingly, each of the power generator systems 102 can provide approximately proportionally equal shares of the generator power POW to the power transmission system 104.

Figure 4:
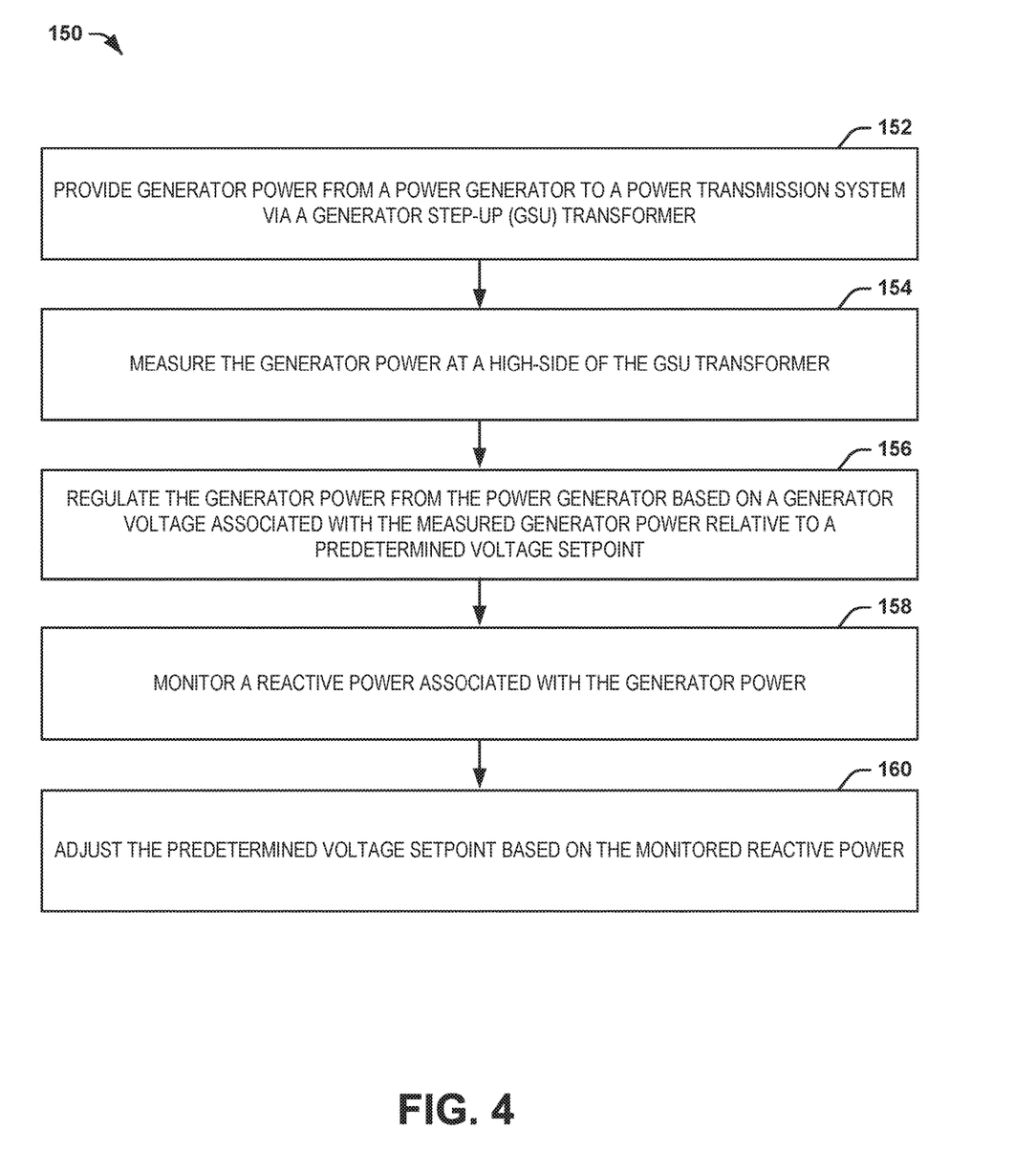
FIG. 4 illustrates an example of a method for mitigating voltage droop in a power generator system.

In view of the foregoing structural and functional features described above, methods in accordance with various aspects of the present disclosure will be better appreciated with reference to FIG. 4. While, for purposes of simplicity of explanation, the method of FIG. 4 is shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement method in accordance with an aspect of the present disclosure.

FIG. 4 illustrates a method 150 for providing generator power from a power generator (e.g., the power generator 56) to a power transmission system (e.g., the power transmission system 14) via a generator step-up (GSU) transformer (e.g., the GSU transformer 58). At 152, the generator reactive power (e.g., the generator power POW) is measured at a high-side of the GSU transformer. At 154, the generator reactive power from the power generator is regulated based on a transmission system voltage (e.g., the transmission system voltage $V_G$) associated with the measured generator power relative to a predetermined voltage setpoint (e.g., the predetermined voltage setpoint SET). At 156, a reactive power (e.g., the reactive power VAR) associated with the generator power is monitored. At 158, the predetermined voltage setpoint is adjusted based on the monitored reactive power.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A utility power system comprising:
   a power generator system, the power generator system comprising a generator step-up (GSU) transformer and a power generator, the power generator being configured to provide generator power to a power transmission system via the GSU transformer in a feedback manner based on a predetermined voltage setpoint;
   a voltage droop compensation controller configured to monitor the generator power at a high-side of the GSU transformer and to adjust the predetermined voltage setpoint based on the monitored generator power to substantially mitigate circulating currents; and
   an automatic voltage regulator (AVR) configured to monitor a respective transmission system voltage associated with the generator power and to provide a power command to the power generator system corresponding to control the generator power from the power generator to the power transmission system based on the amplitude of the respective transmission system voltage relative to the predetermined voltage setpoint.

2. The system of claim 1, wherein the voltage droop compensation controller is configured to adjust the predetermined voltage setpoint relative to a proportion of a predetermined droop percentage by an approximately equal proportion of a reactive power associated with the monitored generator power relative to a maximum reactive power associated with the respective power generator.

3. The system of claim 1, wherein the voltage droop compensation controller is configured to measure a reactive power associated with the monitored generator power, and is configured to adjust the predetermined voltage setpoint based on the reactive power to substantially mitigate the circulating current.

4. The system of claim 1, wherein the predetermined voltage setpoint comprises a sum of a predetermined nominal voltage setpoint and an adjustment voltage amplitude calculated by the voltage droop compensation controller based on the monitored generator power.

5. The system of claim 4, wherein the voltage droop compensation controller comprises a memory configured to store the predetermined nominal voltage setpoint and to store a voltage droop percentage corresponding to a threshold percentage of deviation of the transmission system voltage relative to the predetermined voltage setpoint at a maximum reactive power of the respective power generator.

6. The system of claim 5, wherein the voltage droop compensation controller is configured to adjust the predetermined voltage setpoint relative to a proportion of the voltage droop percentage by an approximately equal proportion of a reactive power associated with the monitored generator power relative to the maximum reactive power.

7. The system of claim 1, wherein the power generator system comprises a power meter configured to monitor the generator power at the high-side of the GSU to determine a transmission system voltage and a reactive power associated with the respective power generator, wherein the voltage droop compensation controller is configured to adjust the predetermined voltage setpoint based on the reactive power and the power generator system is configured to regulate the power generator based on the transmission system voltage relative to the predetermined voltage setpoint.

8. The system of claim 1, wherein the power generator system is one of a plurality of power generator systems, each of the power generator systems comprising a respective GSU transformer and a respective power generator, the respective power generator being configured to provide respective generator power to the power transmission system via the respective GSU transformer in a feedback manner based on a respective predetermined voltage setpoint, wherein the voltage droop compensation controller is configured to monitor the generator power at the high-side of the respective GSU transformer of each of the plurality of power generator systems and to adjust the respective predetermined voltage setpoint associated with the respective one of the plurality of power generator systems based on the monitored generator power associated with the respective one of the plurality of power generator systems to substantially mitigate the circulating currents.

9. The system of claim 1, wherein the power generator is one of a wind farm, a solar farm, or a battery farm.

10. A method for mitigating circulating currents in a utility power system, the method comprising:
   providing generator power from a power generator to a power transmission system via a generator step-up (GSU) transformer;
   measuring the generator power at a high-side of the GSU transformer, wherein measuring the generator power comprises measuring a transmission system voltage and the reactive power via a power meter;

regulating generator reactive power from the power generator based on the transmission system voltage associated with the measured generator power relative to a predetermined voltage setpoint, wherein regulating the generator power comprises providing a power command to the power generator in response to the transmission system voltage relative to the predetermined voltage setpoint via an automatic voltage regulator (AVR);

monitoring a reactive power associated with the generator power; and adjusting the predetermined voltage setpoint based on the monitored reactive power.

11. The method of claim 10, wherein adjusting the predetermined voltage setpoint comprises adjusting the predetermined voltage setpoint relative to a proportion of a predetermined voltage droop percentage by an approximately equal proportion of the measured reactive power relative to a maximum reactive power associated with the power generator.

12. The method of claim 10, wherein the predetermined voltage setpoint comprises a sum of a predetermined nominal voltage setpoint and an adjustment voltage amplitude, wherein adjusting the predetermined voltage setpoint comprises:

calculating the adjustment voltage amplitude based on the measured reactive power; and adding the adjustment voltage amplitude to the predetermined nominal voltage.

13. The method of claim 12, further comprising storing the predetermined nominal voltage setpoint and a voltage droop percentage corresponding to a threshold percentage of deviation of the transmission system voltage relative to the predetermined voltage setpoint at a maximum reactive power of the respective power generator in a memory.

14. The method of claim 10, wherein providing the generator power comprises providing first generator power from a first power generator to the power transmission system via a first GSU transformer, wherein regulating the generator power comprises regulating the first generator power from the first power generator based on a first transmission system voltage relative to a first predetermined voltage setpoint, wherein measuring the reactive power comprises measuring a first reactive power associated with the first generator power, and wherein adjusting the predetermined voltage setpoint comprises adjusting the first predetermined voltage setpoint based on the first measured reactive power, the method further comprising:

providing second generator power from a second power generator to the power transmission system via a second GSU transformer;

measuring the second generator power at a high-side of the second GSU transformer;

regulating the second generator power from the second power generator based on a second transmission system voltage associated with the measured second generator power relative to a second predetermined voltage setpoint;

measuring a second reactive power associated with the second generator power at the high-side of the second GSU transformer; and adjusting the second predetermined voltage setpoint based on the measured second reactive power.

15. A utility power system comprising:

a plurality of power generator systems, each of the power generator systems comprising a generator step-up (GSU) transformer and a power generator, the power generator being configured to provide generator power to a power transmission system via the GSU transformer in a feedback manner based on a predetermined voltage setpoint; and a voltage droop compensation controller configured to monitor a reactive power associated with the generator power at a high-side of the GSU transformer of each of the plurality of power generator systems and to adjust the predetermined setpoint associated with the respective one of the plurality of power generator systems based on the monitored reactive power associated with the respective one of the plurality of power generator systems to substantially mitigate circulating currents;

wherein each of the plurality of power generator systems further comprises an automatic voltage regulator (AVR) configured to monitor a respective transmission system voltage associated with the generator power and to provide a power command to the power generator system corresponding to control the generator power from the power generator to the power transmission system based on the amplitude of the respective transmission system voltage relative to the predetermined voltage setpoint.

16. The system of claim 15, wherein the voltage droop compensation controller is configured to adjust the predetermined voltage setpoint of each of the plurality of power generator systems relative to a proportion of a predetermined droop percentage by an approximately equal proportion of the respective monitored reactive power of each of the plurality of power generator systems relative to a maximum reactive power associated with each of the plurality of power generator systems.

17. The system of claim 15, wherein the voltage droop compensation controller comprises a memory configured to store a predetermined nominal voltage setpoint and a voltage droop percentage corresponding to a threshold percentage of deviation of the transmission system voltage relative to the predetermined voltage setpoint at a maximum reactive power of the respective power generator, wherein the predetermined voltage setpoint comprises a sum of the predetermined nominal voltage setpoint and an adjustment voltage amplitude calculated by the voltage droop compensation controller based on the monitored reactive power associated with the respective one of the plurality of power generator systems.

18. A utility power system comprising:

a power generator system, the power generator system comprising a generator step-up (GSU) transformer and a power generator, the power generator being configured to provide generator power to a power transmission system via the GSU transformer in a feedback manner based on a predetermined setpoint; and a voltage droop compensation controller configured to monitor the generator power at a high-side of the GSU transformer and to adjust the predetermined setpoint based on the monitored generator power to substantially mitigate circulating currents;

wherein the power generator system is one of a plurality of power generator systems, each of the power generator systems comprising a respective GSU transformer and a respective power generator, the respective power generator being configured to provide respective generator power to the power transmission system via the respective GSU transformer in a feedback manner based on a respective predetermined setpoint, wherein the voltage droop compensation controller is configured to monitor the generator power at the high-side of the respective GSU transformer of each of the plurality of power generator systems and to adjust the respective predetermined setpoint associated with the respective one of the plurality of power generator systems based on the monitored generator power associated with the respective one of the plurality of power generator systems to substantially mitigate the circulating currents.

* * * * *